United States Patent

Boothman et al.

[11] 3,838,314
[45] Sept. 24, 1974

[54] DETECTOR FOR REVERSE AND OPEN PHASE IN A THREE PHASE CIRCUIT

[75] Inventors: David Richard Boothman, Ennismore, Ontario; David Walter Nutt, Peterborough, Ontario, both of Canada

[73] Assignee: Canadian General Electric Company, Limited, Toronto, Canada

[22] Filed: May 21, 1973

[21] Appl. No.: 362,049

[30] Foreign Application Priority Data
Oct. 11, 1972 Canada .................................. 153622

[52] U.S. Cl. ..................................... 317/48, 317/47
[51] Int. Cl. ............................................. H02h 3/26
[58] Field of Search ........... 307/127, 130, 202, 204; 317/26, 33 SC, 46, 48, 47, 51; 328/96, 99, 133

[56] References Cited
UNITED STATES PATENTS

| | | | |
|---|---|---|---|
| 3,431,467 | 3/1969 | Calfee | 317/48 |
| 3,495,130 | 2/1970 | Bruner et al. | 317/48 |
| 3,584,259 | 6/1971 | Traub et al. | 317/47 |
| 3,633,072 | 1/1972 | Duncan | 317/48 |
| 3,651,393 | 3/1972 | Pohm | 317/47 |
| 3,681,636 | 8/1972 | Calfee | 317/47 |

Primary Examiner—J. D. Miller
Assistant Examiner—Patrick R. Salce
Attorney, Agent, or Firm—James H. Beusse; Harold H. Green, Jr.

[57] ABSTRACT

According to the invention a transducer coupled to a three phase AC supply for a load provides three trains of overlapping voltage waveforms displaced 120° in time and of phase sequence following the supply sequence. A waveform converter converts these voltage waveforms into three trains of square waveforms of the same repetition rate, substantially the same duration, and displaced 120° in time but overlapping in duration. The square waveforms are then impressed on a wye circuit configuration consisting of a resistor and a gate controlled semiconductor connected in series and to the wye point in that order for each leg. Each semiconductor is gated on upon its anode going positive by another waveform which is of gating polarity and overlaps the positive going anode waveform. During normal three phase operation of the load, the positive voltages on the anodes of the semiconductor are substantially zero. During reversal or loss of phase of the load, these voltages are no longer zero and are detected by a detector circuit which signals the presence of the fault.

8 Claims, 4 Drawing Figures

DETECTOR FOR REVERSE AND OPEN PHASE IN A THREE PHASE CIRCUIT

BACKGROUND OF THE INVENTION

This invention relates to a detector for detecting a reverse and an open phase in a three phase AC circuit, and in particular a load such as a dynamoelectric machine.

Incorrect phase rotation is caused by an incorrect connection of the leads of a three phase power supply to a load. This may occur during initial installation or after a maintenance operation involving disconnecting and reconnecting the leads. At the lower voltages a check on sequence can be made at the line connections, but at the higher voltages this is impractical. As a result some indirect means must be employed at the higher voltages, for example, some means employing the signals available at the outputs of the instrument transformers.

When a three phase load loses the voltage on one phase of its winding the voltage across the remainder of the winding shifts phase and becomes, in effect, a single phase supply for the load. In the case of loads such as electric motors, this can be very serious because some motors may be damaged within seconds of the loss of phase. The most common cause of phase loss is the blowing of a fuse during the starting period of the motor when the inrush current is extremely high. The most reliable phase loss system is one which senses a loss of line current. Sensing a loss of voltage is somewhat less reliable because it depends on the break occurring upstream from the sensing point.

When the current transformers are present, they provide the signal source. However, problems arise in the detector circuits now used with current transformers because the line currents vary widely. In the case of motors, these currents vary from starting inrush to normal operation, a ratio of 25:1 being quite common. To accommodate this great a current variation, the current transformers may have a ratio in the order of 100:1. It is impractical to use the traditional phase shifting and vector summing networks over such a wide range. In general these circuits are limited to a transformer range of about 10:1, and then with some restrictions.

Although current sensing is preferred because the break in a line may be either upstream or downstream from the sensing point, voltage sensing is frequently adequate. In the case of a motor, the break is usually due to a blown fuse. Hence by placing the potential transformers between the fuses and the motor, a blown fuse is as readily detected from voltage as it is from current.

The object of this invention is to provide improved circuit for detecting phase reversal and an open phase.

According to the invention a transducer coupled to a three phase AC supply for a load provides three trains of overlapping voltage waveforms displaced 120° in time and of phase sequence following the supply sequence. A waveform converter converts these voltages into three trains of voltage waveforms which have the same repetition rate and substantially the same duration as the original voltages, and which are displaced 120° in time but overlapping in duration. These voltage waveforms are then impressed on a wye circuit configuration consisting of a resistor and a gate controlled semiconductor connected in series and to the wye point in that order for each leg. Each semiconductor is gated on upon its anode going positive by another waveform which is of gating polarity and overlaps the positive going anode waveform. During normal three phase operation of the load, the positive voltages on the anodes of the semiconductors are substantially zero. During reversal or loss of phase of the load, these voltages are no longer zero and are detected by a detector circuit which signals the presence of the fault.

A preferred embodiment of the invention will now be described with reference to the drawings, in which FIG. 1 is a circuit diagram of the invention;

DESCRIPTION OF THE PREFERRED EMBODIMENT

Figure 1:
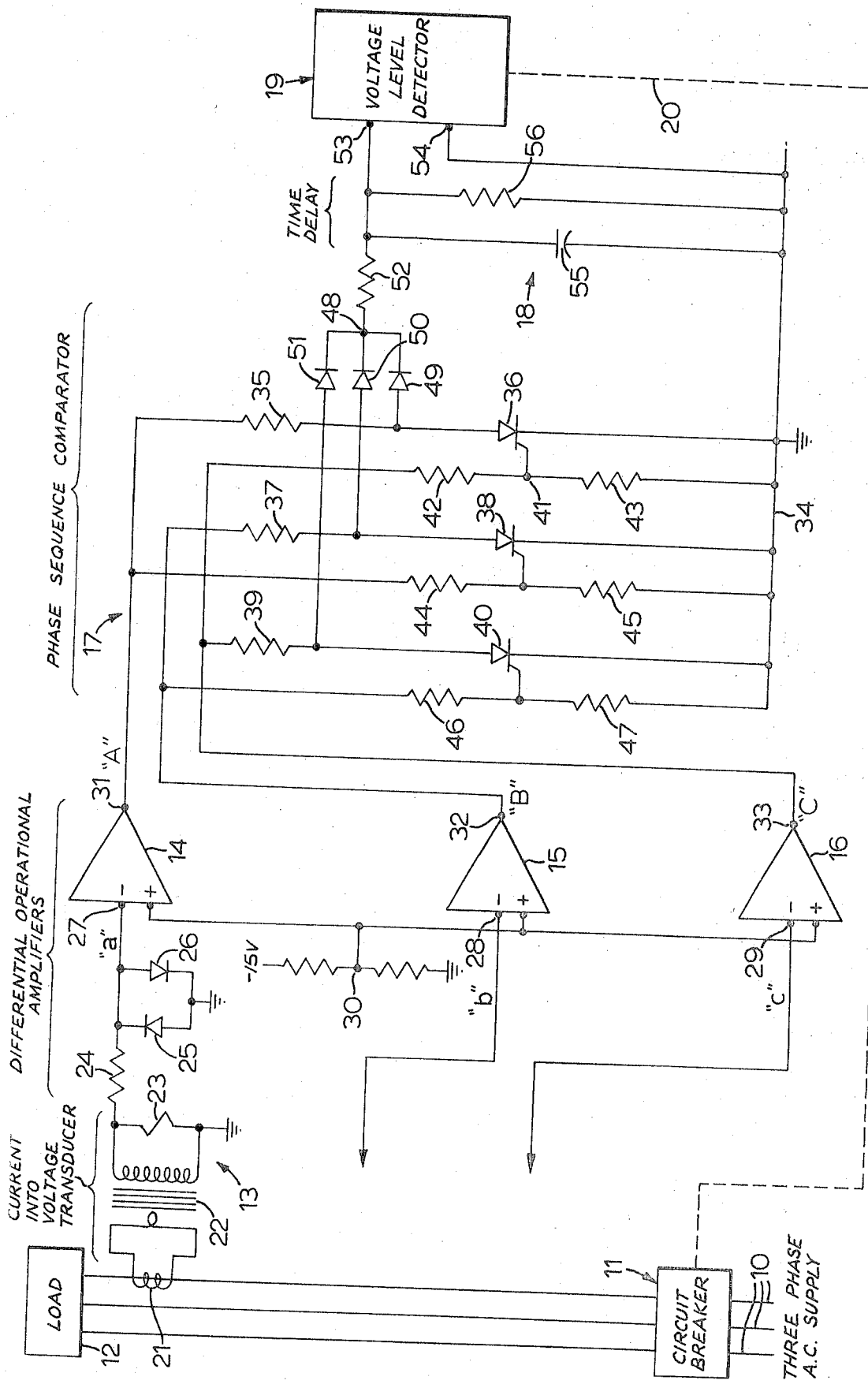

The detector circuit shown in FIG. 1 consists essentially of the following circuit components: a three phase AC supply connected through a circuit breaker 11 to a load 12 by means of three lines 10; a current into voltage transducer 13 for each line 10; a waveform converter in the configuration of three differential operational, each comprised of a resistor 24 and an amplifier 14, 15 or 16; a phase sequence comparator 17; a time delay circuit 18; a voltage level detector 19; and conductors represented by the dashed line 20 connecting the detector to the circuit breaker.

The current into voltage transducer shown at 13 consists of a low ratio current transformer 21 coupled to a line 10 and a high ratio current transformer 22 burdened by a resistor 23 and connected to the input terminal 27 of amplifier 14 through its resistor 24. The signal appearing at terminal 27 is a very small AC current which is proportional to the current flowing in the line. It is in the order of a fraction of a milliampere. Diodes 25 and 26 protect amplifier 14 against excessive voltages such as voltage spikes. Like transducers are coupled to the other two lines and to the corresponding input terminals 28 and 29 of amplifiers 15 and 16 respectively via resistors 24. The other input terminals of the amplifiers are connected together and to a small negative bias 30 which sets the switching points of the amplifiers very near the zero points in the AC inputs. The amplifier input circuit is of three phase configuration, hence the amplifiers receive a very low three phase, AC input which is proportional to the three phase current in lines 10.

The output terminals 31, 32 and 33 of amplifiers 14, 15 and 16 respectively are connected to a three phase wye circuit. In this circuit, terminal 31 is connected to the common or neutral conductor 34 through a current limiting resistor 35 and a gate controlled semiconductor 36, terminal 32 to the neutral through a similar resistor 37 and semiconductor 38, and terminal 33 to the neutral through resistor 39 and semiconductor 40. Thyristors are well suited for use at 36, 38 and 40 and the semiconductors will be referred to as such from now on. Thyristor 36 has its gate connected to a point 41 between resistors 42 and 43 of a voltage dividing network, and the network is connected across phase C and the neutral conductor 34. The gates of thyristors 38 and 40 are connected to similar voltage dividing networks 44, 45 and 46, 47, and these two networks are connected across phases A and B respectively and the neutral. The anodes of thyristors 36, 38 and 40 are connected to a common point 48 via diodes 49, 50 and 51 respectively, and the common point through a current limiting resistor 52 to one input terminal 53 of the voltage level detector 19. Conductor 34 is connected to the other input terminal 54 of the detector.

Time delay circuit 18 is placed ahead of the detector input, and it may be any one of a number of known delay circuits capable of giving a short time delay. It may, in its simplest form, be a capacitor 55 and a resistor 56 connected in parallel across the detector input terminals. Detector 19 is in the form of a voltage sensitive switch, a switch capable of remaining in one stable state at zero voltage input and switching to its other state at a relatively low voltage input. A detector 19 suitable for this purpose will be described later.

Figure 2:
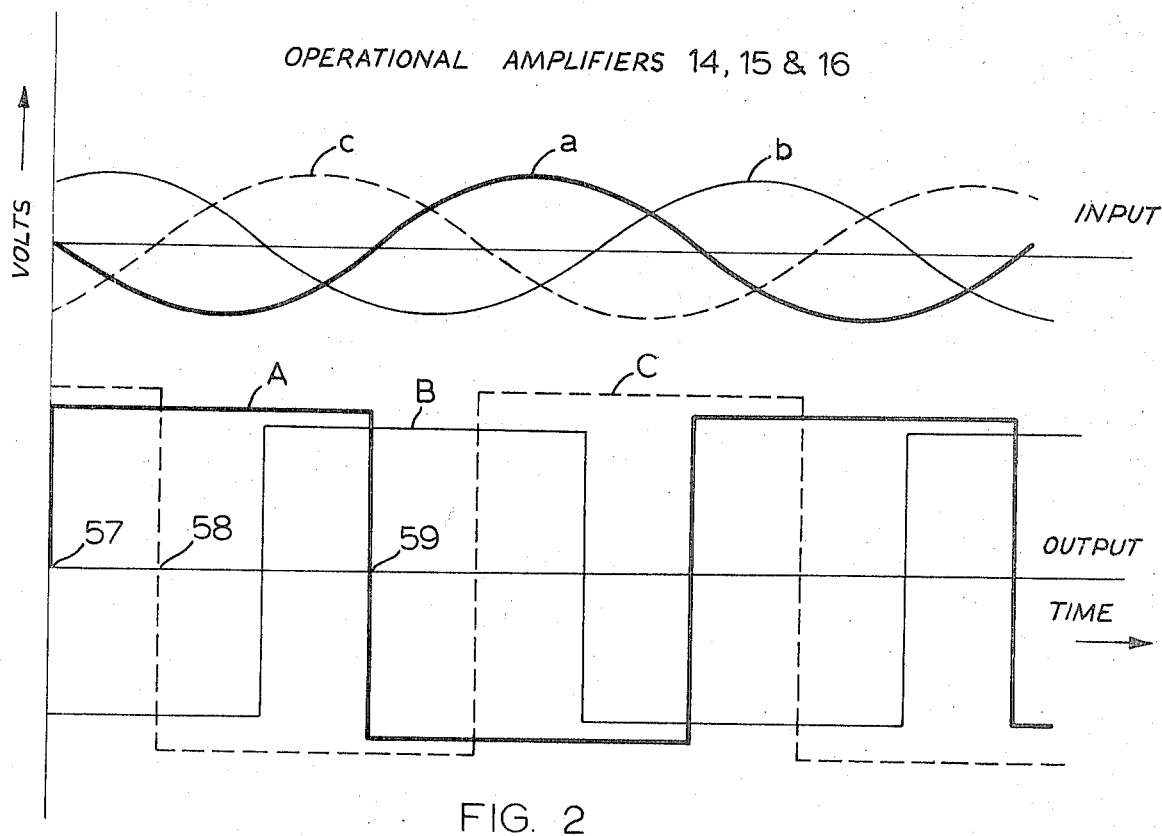
FIG. 2 is a graphic representation of the wave forms appearing in the circuit of FIG. 1.

The operation of the detector circuit shown in FIG. 1 will now be described with reference to FIG. 2. As already pointed out, the input to amplifiers 14, 15 and 16 is a three phase AC current proportional to the AC current to load 12. It is a very small signal and may be represented by the sine waves a, b and c shown at the top of FIG. 2. Each one of the amplifiers 14, 15 and 16 is used in the open loop comparator mode of operation so that a small input current of either polarity gives a maximum output voltage of the opposite polarity and substantially square waveform. In other words, on each zero of the input, the amplifier switches polarity so rapidly that for purposes of this invention the form of each half cycle of its output is substantially rectangular. In switching, the output voltage rises instantly from zero to a maximum amplitude where it remains constant until switched again, when it falls instantly to zero and repeats in the opposite polarity. There is, of course, some delay in switching from one polarity to the other, but this delay is not long enough to affect the phase sequence comparator. The waveform just described as being rectangular in shape is better known as a square waveform and will be referred to hereinafter as such. Since the currents a, b and c put into the three amplifiers are displaced 120° in phase, the voltages A, B and C put out by the three amplifiers are also displaced 120° in phase with respect to one another as illustrated in the lower part of FIG. 2. These three waveforms will be the same, although illustrated of different amplitudes for purposes of drawing clarity.

The operation of the phase sequence comparator 17 will now be considered. Thyristors 36, 38 and 40 have phase voltages A, B and C respectively impressed across them, and each is gated on from another phase through a voltage divider. Thyristor 36 is gated from divider 42, 43 in phase C, thyristor 38 from divider 44, 45 in phase A, and thyristor 40 from divider 46, 47 in phase B. Consider now phase A. As it turns positive at time 57, phase C is already positive and will remain so for another 60° until time 58. Hence, at the time that phase A turns positive full gating voltage is already present on thyristor 36. As a result, thyristor 36 conducts the full positive half cycle of phase A, turning off again at time 59 when A falls to zero. It can be readily seen from the square waves that upon voltage B turning positive thyristor 38 is gated on from voltage A in the same way, and upon voltage C turning positive thyristor 40 is gated on from voltage B. Resistors 35, 37 and 39 limit the currents conducted by the thyristors to relative low values. As a result the positive voltages at the anodes of the thyristors will remain at a value very near zero, a value low enough that only an insignificant positive voltage will appear at point 48. Since the diodes 49, 50 and 51 block the negative voltages and the positive voltages are virtually zero, the voltage at point 48 is zero or negligible as long as the phase rotation is correct. Should any two of the leads 10 become interchanged, the voltages for firing the thyristors will be negative at the times that the anodes of the thyristors turn positive. Because the gates of the thyristors remain negative for some time after their anodes turn positive, they fire late in the positive half cycles. During normal operation the phase sequence illustrated in FIG. 2 is from left to right with respect to time, i.e., in the order A, B, C. Should any two of the leads 10 become interchanged, the sequence of FIG. 2 can be thought of as from right to left, i.e., in the order C, B, A. Consider now phase A and C again for purposes of illustration. Phase C will now be negative at the time 59 that A goes positive, and it will remain negative for another 120° until time 58 when it turns positive and gates thyristor 36 on. Hence the full positive voltage A will appear on the anode of thyristor 36 for 120°, and this voltage will also appear at point 48. The same applies for the other two thyristors.

A loss of one phase to load 12 also produces a positive voltage at point 48. If, for example, phase C disappears from a fuse blowing in one of the lines 10, phase B appears as a mirror image of phase A, that is, phase A and B are now of directly opposite polarity. Phase B turns negative at the instant that A turns positive and vice versa. As a result, thyristors 36 and 38 will not be turned on, and a very significant voltage will therefore appear at point 48.

When the voltage on point 48 rises above a predetermined value, it is detected by detector 19 and in response thereto the detector causes breaker 11 to open the circuit to load 12. This occurs after a very brief delay provided by the time delay circuit 55, 56. The time constant of circuit 55, 56 is just long enough to absorb surges which can occur on the system, thus preventing nuisance tripping.

In summary, during normal operation there is no voltage or a negligible voltage at point 48. Should a reversal or loss of phase occur in the three phase AC supply to the load, a significant voltage appears at point 48. This voltage then charges capacitor 55, and in a short time the capacitor becomes charged to a voltage level detectable by the detector, whereupon the detector causes the breaker to open.

Although waveforms A, B and C are shown as square or rectangular, it is not essential that they be so. These waveforms can be other than square provided they overlap and C is sufficiently positive to fire thyristor 36 on the positive rise of A, A is sufficiently positive to fire thyristor 38 on the positive rise of B, and B is sufficiently positive to fire thyristor 40 on the positive rise of C. The thyristors must conduct most of the positive voltages A, B and C so that only a very small voltage appears at point 48 except when a malfunction develops.

It is to be noted from FIG. 1 that the gates of the three thyristors are connected to intermediate points of voltage dividing networks. Resistors 42, 44 and 46 are provided to limit gate currents; resistors 43, 45 and 47 are not needed for firing and can be dispensed with. Resistors 43, 45 and 47 are provided to minimize misfiring of the thyristors, i.e., make the thyristors less sensitive to malfunctions due to noise transients. Resistors 43, 45 and 47 of high ohmic value compared with resistors 42, 44 and 46 (around 10 K ohms) have been found very effective in reducing malfunctions of those thyristors sensitive to firing by extraneous signals.

Figure 3:
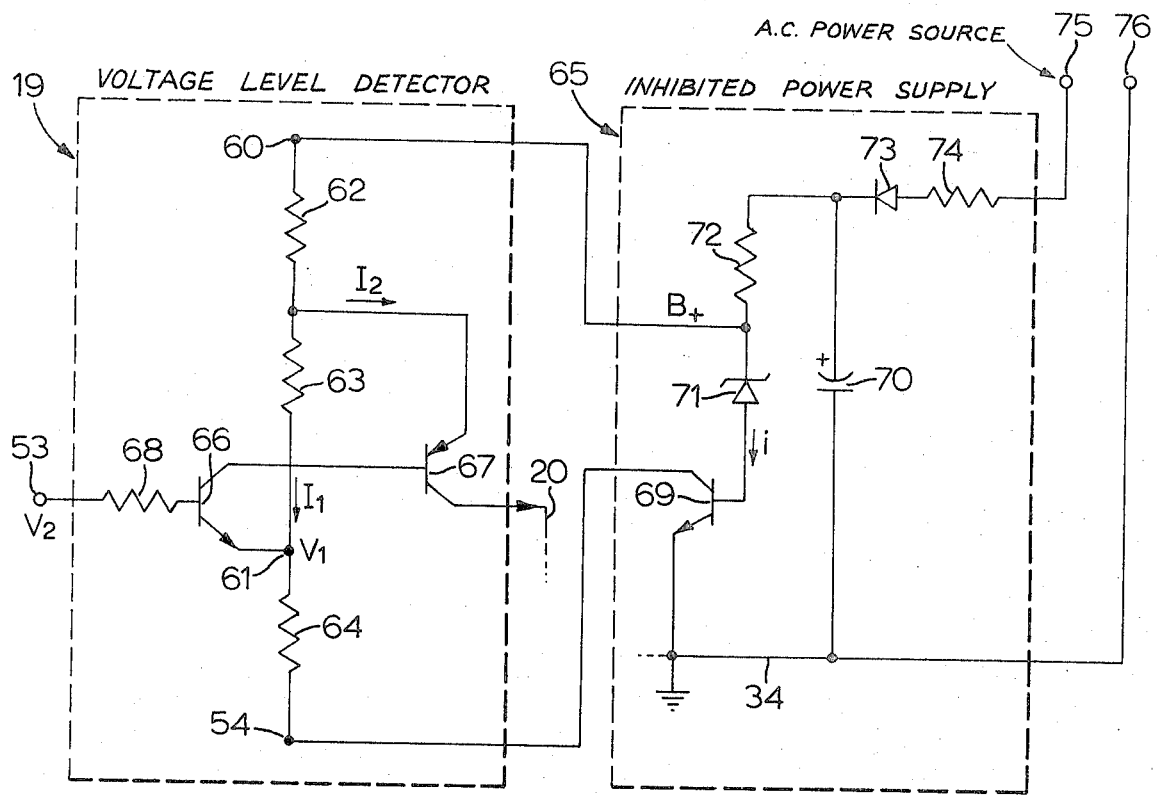
FIG. 3 is a diagram of a voltage level detector and an inhibit circuit.

A voltage level detector suitable for use at 19 in FIG. 1 will now be described with reference to FIG. 3. In the latter circuit V2 is the voltage from comparator 17 appearing on terminal 53 of detector 19 and the B+ at point 60 is a constant positive bias voltage provided by the power supply 65. Point 61 is therefore at a fixed voltage V1 due to the current I1 flowing down through resistors 62, 63 and 64 to terminal 54, which terminal is now connected to the inhibit portion of circuit 65 rather than to the neutral conductor 34 as in FIG. 1. Initially, with V2 low, transistors 66 and 67 are both turned off. When V2 exceeds V1 by more than the voltage from base to emitter of transistor 66 (by about 0.5 volts) transistor 66 turns on. When transistor 66 is turned on current is drawn from the base of transistor 67; this current now turns transistor 67 on. With transistor 67 now turned on, current I2 is conducted by the transistor to the controls of circuit breaker 11 via conductor 20. Current I2 comes from the B+ bias at 60 and passes through resistor 62. This additional current through resistor 62 increases the voltage drop across the resistor and therefore decrease voltage V1 by the amount of the drop. Since voltage V2 has not changed but voltage V1 has decreased, transistor 66 turns on harder. The net result is a feedback circuit which as soon as the threshold is reached turns hard on with no soft intermediate transition zone. To turn the transistors off again voltage V2 must fall below the turn on value by an amount equal to current I2 multiplied by the resistance of resistor 62. For example, this IR drop may be equal to $1.5K \times 1$ m.a. $= 1.5$ volts. The 1.5 volts is referred to as the hysteresis.

Circuit 65 is the power supply for operational amplifiers 14, 15 and 16 and the level detector 19. It includes an inhibit feature designed to eliminate nuisance tripping of circuit breaker 11 by detector 19 during transient power loss at its AC input terminals 75 and 76. The inhibit feature also prevents breaker tripping when the power to circuit 65 is turned off. Instead of connecting terminal 54 directly to the neutral conductor 34, it is now connected to the neutral via a transistor 69. A capacitor 70 is charged by way of diode 73 and resistor 74 from the same AC source. When the voltage on capacitor 70 exceeds the threshold voltage of zener diode 71, current $i$ flows down through resistor 72, through the zener diode, into the base of transistor 69 and out the emitter of the transistor to the neutral conductor. This flow of current $i$ turns the transistor on to provide a current flow path from terminal 54 to conductor 34. This represents the normal operating situation, and should the voltage level detector now register a phase defect a circuit exists through the inhibitor. However, should the power at terminals 75, 76 be interrupted, even momentarily, the zener diode 71 cuts off and stops current $i$ to the base of transistor 69. As a result, the transistor turns off and suppresses operation of the voltage level detector in that terminal 54 is in effect disconnected from the neutral conductor 34. Hence during these abnormal conditions, the phase detector cannot cause the circuit breaker to disconnect the load from the line. A power supply including this type of inhibit feature is described in more detail in the applicant's copending Canadian application, Ser. No. 155,043 filed Oct. 26, 1972 and corresponding U.S. application, Ser. No. 362,048 filed May 21, 1973.

It was pointed out in the introduction that a loss of voltage between any two of the three lines 10 of the three phase AC supply for load 12 can be used as a detector signal in place of a current signal, although the protection provided will be somewhat less. However, voltage signals may provide adequate protection for many installations, and may therefore be used in installations where voltage transducers are readily available but current transducers are not.

Figure 4:
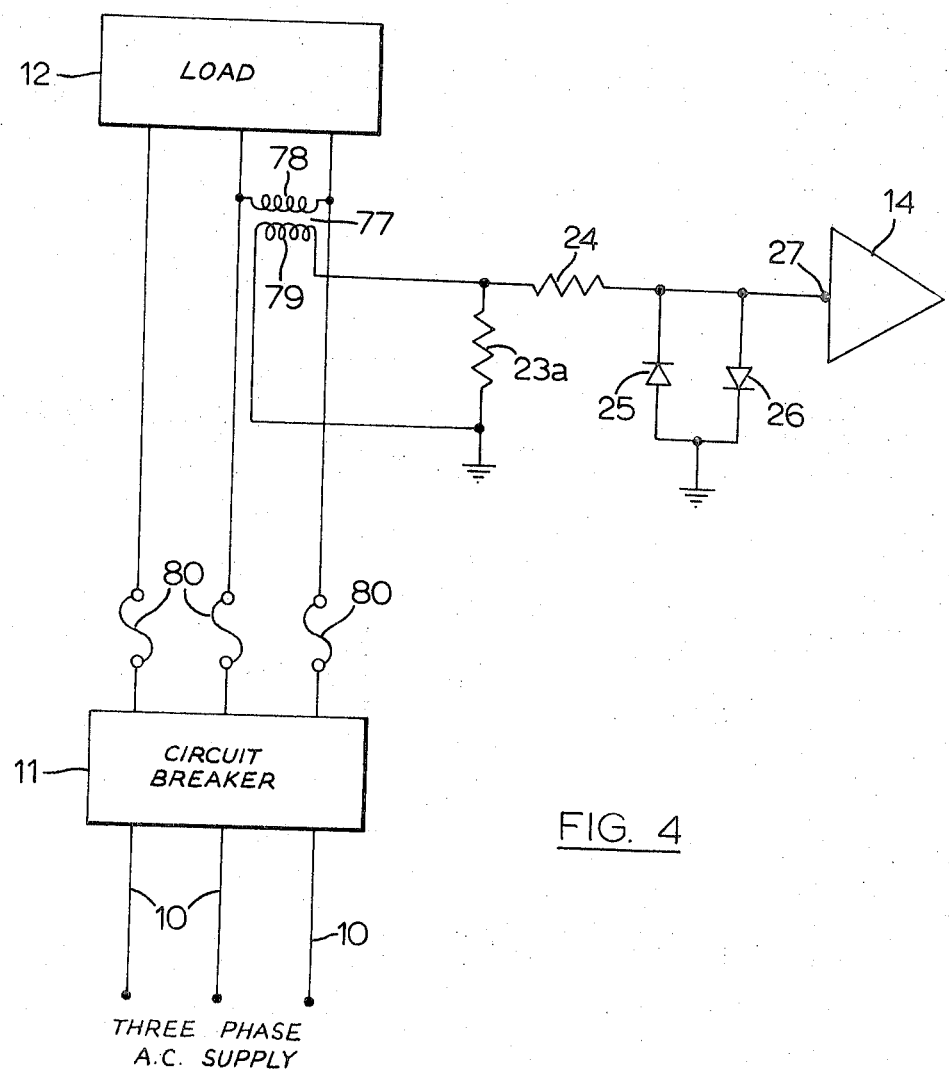
FIG. 4 is a diagram of a voltage sensing circuit for use in FIG. 1 in place of the current into voltage transducer.

FIG. 4 is a typical illustration of the use of voltage transducers, e.g., potential transformers, as the signal source. In this figure, potential transformer 77 has its primary winding 78 connected across two of the lines 10 and its secondary winding 79 connected to resistor 23a. This resistor serves as a burden on the transformer much the same as resistor 23 does in FIG. 1. The connection made between resistor 23a and amplifier 14 are the same as those in FIG. 1. A like transformer 77 and resistor 23a is provided for each of the remaining pairs of line 10 for connection to amplifiers 15 and 16 respectively.

In the case of incorrect phase rotation due to an interchange of a pair of lines 10, a voltage signal is as good as a current signal. Both sense a fault on the supply side of the transducers, and not on the load side. In the case of an open line, current transducer will sense it on either the supply or the load side of the transducers. However, in the case of voltage transducers the break must occur on the source side in order to be sensed. Most line interruptions are due to blown fuses, and since the fuses are located on the source side of the transducers as indicated at 80 in FIG. 4, potential transformers are as effective as current transducers in detecting blown fuses. Hence the potential transformers may be used if it is convenient to do so.

The embodiments of the invention in which an exclusive property or privilege is claimed are defined as follows:

1. A detector for detecting reverse and open phase in a three phase AC power circuit comprising transducing means coupled with said circuit, said transducing means producing a three phase voltage output of waveforms representing the three phase waveforms in said power circuit; a wave form converter having its input terminals connected to the output terminals of said transducing means and its output terminals connected to conductors A, B and C respectively, said converter converting said voltage input thereto into a three phase output voltage of substantially square waveform; a first resistor and a first thyristor connected in series in the following order: resistor to said conductor A and to the anode of the thyristor, and the cathode of the thyristor to a common conductor; a second resistor and a second thyristor connected in series between said conductor B and said common conductor in the same order as said first resistor-thyristor combination; a third resistor and a third thyristor connected in series between said conductor C and said common conductor in the same order as said first resistor - thyristor combination; first resistance means connected between said conductor C and the gate of said first thyristor; second resistance means connected between said conductor A and the gate of said second thyristor; third resistance means connected between said conductor B and the gate of said third thyristor; and a voltage level detector having one input terminal connected to the anodes of said three thyristors and the other input terminal to said common conductor.

2. The detector of claim 1 wherein the anode of each thyristor is connected to said one input terminal of the voltage level detector through rectifying means which allows voltages of one polarity only to the detector for detection thereby.

3. The detector of claim 2 wherein a capacitor-resistor time delay is connected across the input terminals of said voltage level detector.

4. The detector of claim 2 wherein said rectifying means comprises a diode for each one of said thyristors connected anode of the diode to anode of the thyristor, and cathodes of all three diodes to said one input terminal of the voltage level detector.

5. The detector of claim 1, wherein said waveform converter comprises three differential operational amplifiers adapted to operate in an open loop comparator mode so that a small AC input gives a maximum output of opposite polarity and substantially square waveform, each one of said amplifiers having an input connected to a different phase of said transducer output on an output terminal to a different one of said conductors A, B or C.

6. The detector of claim 1, wherein an inhibit circuit is placed in the connection from said other input terminal and said voltage level detector and said common conductor, said inhibit circuit eliminating spurious detections by the voltage level detector due to transients on or interruptions of the power supply for said waveform converter.

7. The detector of claim 1 wherein said transducing means are current into voltage transducers.

8. The detector of claim 1 wherein said transducing means are voltage transducers such as potential transformers.

* * * * *